(12) United States Patent
Griffin et al.

(10) Patent No.: US 11,574,305 B1
(45) Date of Patent: Feb. 7, 2023

(54) EXTENSIBLE ELECTRONIC PAYMENT SCHEMA

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 287 days.

(21) Appl. No.: 16/417,396

(22) Filed: May 20, 2019

(51) Int. Cl.
    *G06Q 40/00*     (2012.01)
    *G06Q 20/38*     (2012.01)
    *H04L 9/32*     (2006.01)

(52) U.S. Cl.
    CPC ....... *G06Q 20/389* (2013.01); *G06Q 20/3825* (2013.01); *H04L 9/3247* (2013.01)

(58) Field of Classification Search
    CPC .............................. G06Q 50/10; G06F 16/278
    USPC ......................................................... 705/44
    See application file for complete search history.

(56) References Cited

U.S. PATENT DOCUMENTS

2019/0130135 A1* 5/2019 Park ...................... G06F 3/0652
2020/0013027 A1* 1/2020 Zhu ..................... G06Q 20/0658

* cited by examiner

*Primary Examiner* — Ojo O Oyebisi
(74) *Attorney, Agent, or Firm* — Foley & Lardner LLP

(57) ABSTRACT

In one arrangement, a non-transitory computer readable media having computer-executable instructions embodied therein that, when executed by at least one processor of a computing system, cause the computing system to process an electronic transaction using a schema. The schema includes a first unique entity object identifier identifying a sender, a second unique entity object identifier identifying a receiver, and a first transaction object identifier identifying the transaction. The first transaction object identifier is located at a top level of a hierarchy of a plurality of transaction object identifiers. The schema further includes transaction information comprising the first unique entity object identifier, the second unique entity object identifier, and the unique transaction object identifier.

17 Claims, 9 Drawing Sheets

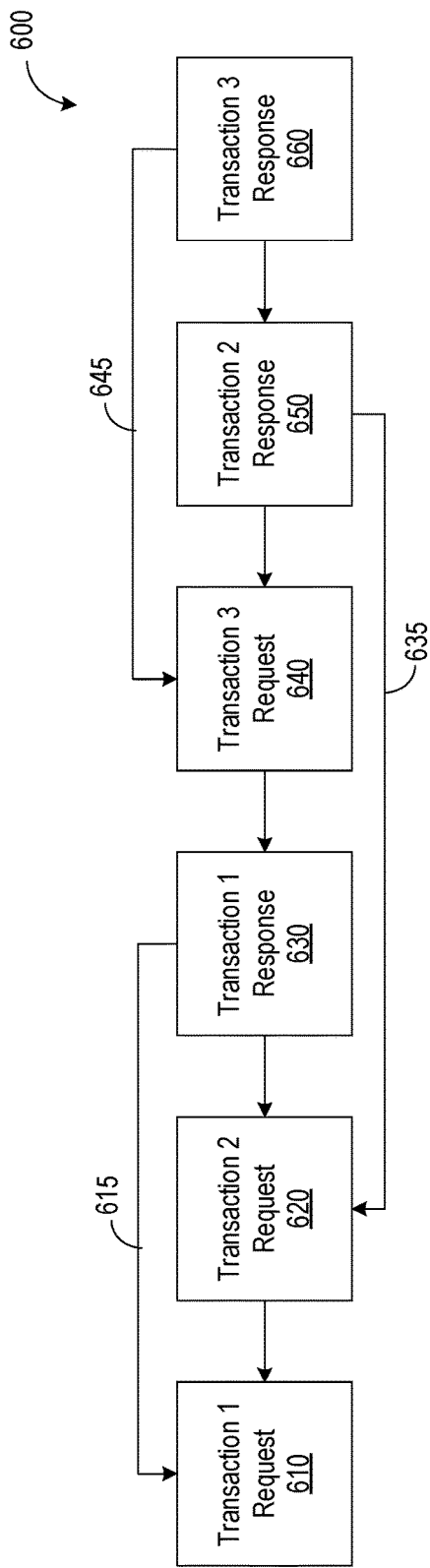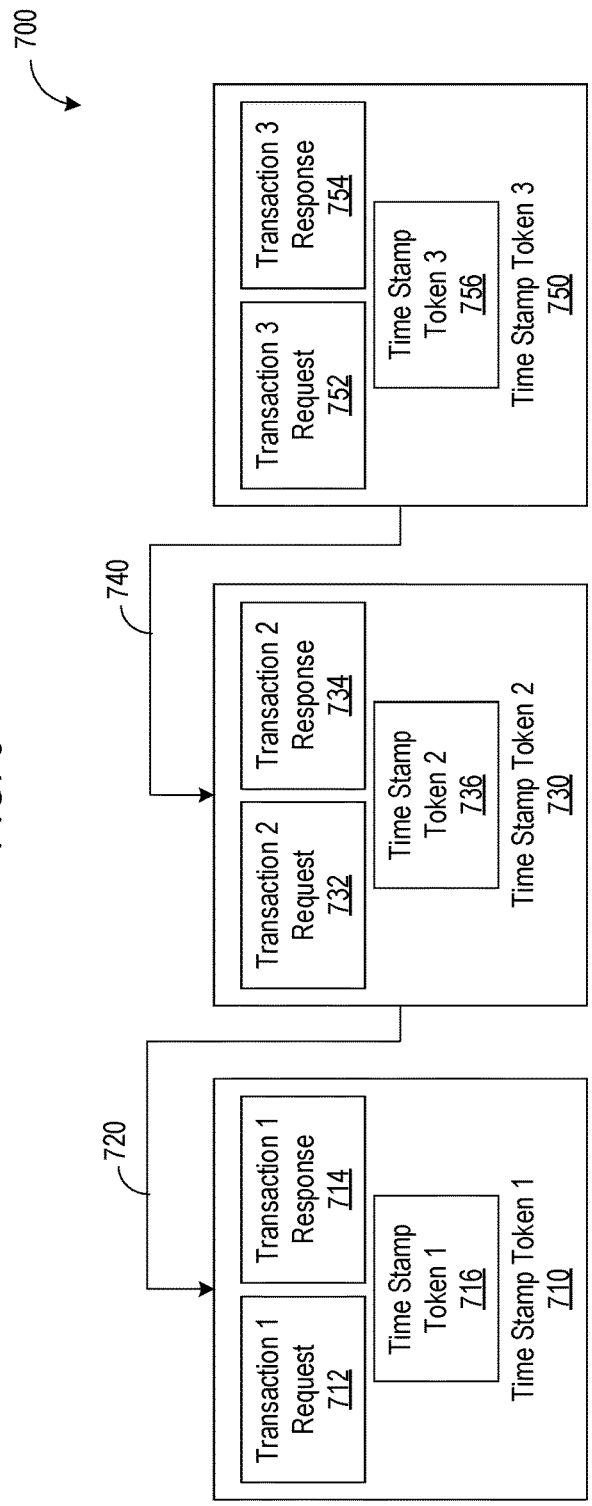
FIG. 6
FIG. 7

EXTENSIBLE ELECTRONIC PAYMENT SCHEMA

BACKGROUND

Today's business applications rely on a wide variety of cybersecurity and cryptographic solutions that are implemented haphazardly that often ignore industry practices for sound key management. Examples of poor key management practices include allowing raw public keys, self-sign certificates, fixed keys, and electronic signatures used in an attempt to achieve legally defined non-repudiation. Some message protocol implementations offer no cryptographic solutions, relying solely on network security solutions such as Transport Layer Security (TLS), Internet Protocol Security (IPsec), or wireless protocols. Inconsistent, improper, and invalid cryptographic controls are an unrealized vulnerability that advanced adversaries are exploiting today.

SUMMARY

In one arrangement, a non-transitory computer readable media having computer-executable instructions embodied therein that, when executed by at least one processor of a computing system, causes the computing system to process an electronic transaction using a schema. The schema includes a first unique entity object identifier identifying a sender, a second unique entity object identifier identifying a receiver, and a first transaction object identifier identifying the transaction. The first transaction object identifier is located at a top level of a hierarchy of a plurality of transaction object identifiers. The schema further includes transaction information comprising the first unique entity object identifier, the second unique entity object identifier, and the unique transaction object identifier.

In another arrangement, a method for recording a transaction within a blockchain having a plurality of blocks includes writing a first message to a first block of the blockchain, the first message associated with a first transaction. The method further includes writing a second message to a second block of the blockchain, the second message associated with a second transaction, the second message cryptographically-linked to the first block. The method further includes writing a third message to a third block of the blockchain, the third message associated with the first transaction, the third message cryptographically-linked to the first block and the second block. The method also includes writing a fourth message to a fourth block of the blockchain, the fourth message associated with the second transaction, the fourth message cryptographically-linked to the second block and the third block.

In another arrangement, a method for recording a transaction within a blockchain having a plurality of blocks is provided. The method includes writing a first message associated with a first transaction in a first block, the first message comprising data associated with the first transaction. The method further includes adding a first timestamp token to the first block, the first timestamp token recording a time at which the first message was included in the first block. The method includes writing a second message associated with a second transaction in a second block, the second message comprising data associated with the second transaction, and adding a second timestamp token to the second block, the second timestamp token recording a time at which the second message was included in the second block. The second block is cryptographically linked to the first block.

In another arrangement, a method for recording a transaction within a blockchain having a plurality of blocks comprises recording a first message associated with a first transaction in a first block, the first message comprising data associated with the first transaction, and adding a first time stamp to the first block, the first time stamp recording the time at which the first message was included in the first block, the first times tamp linked to a system of record. The method further comprises recording a second message associated with a second transaction in a second block, the second message comprising data associated with the second transaction, and adding a second time stamp to the second block, the second time stamp recording the time at which the second message was included in the second block. The second block is linked to the first block by linking the second time stamp to the first time stamp.

In another arrangement, a method for verifying a transaction between a sender and a receiver comprises assigning a first unique object identification number to the sender, the first unique object identification number being only associated with the sender. The method further comprises assigning a second unique object identification number to the receiver, the second unique object identification number being only associated with the receiver. A third unique object identification number is assigned to the transaction, where the third unique object identification number is only associated with the transaction. The method includes securing transaction tracking information associated with the transaction, where the transaction tracking information includes the first unique object identifier, the second unique object identifier, and the third unique object identifier. The secure transaction tracking information is sent to the transaction verification system by the sender. The receiver provides the second unique object identifier to the transaction verification system, and the transaction verification system verifies the transaction.

These and other features, together with the organization and manner of operation thereof, will become apparent from the following detailed description when taken in conjunction with the accompanying drawings.

BRIEF DESCRIPTION OF THE DRAWINGS

FIG. 6 is a block diagram of an example of storing EEPS transactions in a blockchain, according to various arrangements.

FIG. 7 is a block diagram of another example of storing EEPS transactions in a blockchain, according to various arrangements.

DETAILED DESCRIPTION

Referring generally to the FIGS., apparatuses, systems, methods, and non-transitory computer-readable media described herein relate to Electronic Extensible Payment Systems (EEPS). In arrangements described herein, EEPS enables cryptographic solutions for an electronic system (e.g., an electronic payment system) with any message schema using globally unique object identifiers (OID) to empower business applications for data confidentiality, data integrity and authenticity, and legally defined non-repudiation, going well beyond electronic signatures. Algorithms disclosed herein can be integrated into an electronic system that works with electronic messages (e.g., EEPS). EEPS is business and message agnostic such that its security mechanisms are applicable to any message-based protocol for any industry, and in particular for the financial services industry in which sensitive electronic data messages are being exchanged over a network.

A few standards exist, but are independent of the business needs or security needs. W3C offers XML Signature Syntax v1.1 as a generic digital signature for XML encoded messages. See http://www.w3.org/TR/xmldsig-core1/. ASC X9 offers X9.73 Cryptographic Message Syntax—ASN.1 and XML as a generic data protection standard for ASN.1 or XML encoded messages. See www.x9.org. IETF offers RFC 5652 Cryptographic Message Syntax as a generic specification for ASN.1 encoded messages. See https://tools.ietf.org/html/rfc5652. ISO offers ISO 20022 Universal Financial Industry Message Scheme as a generic standard for XML encoded messages organized by business models but without security controls. See www.iso20022.com.

Arrangements described herein provide for a generic message schema that can support existing payment schemes such as ISO 8583 for credit and debit cards, automated clearing house (ACH), real time payment (RTP), or even the Society for Worldwide Interbank Financial Telecommunications (SWIFT), using cryptographic message syntax (CMS) based messages and globally unique identifiers that are backwards compatible, and forward innovation including blockchain. Existing identification systems such as bank issuer number (BIN) per ISO 7812, institution identification number (IIN) per ISO 8583, or country codes per ISO 3166 can be incorporated into the EEPS identification scheme. Other identification schemes include legal entity identifier (LEI) as defined in ISO 17442.

Figure 1:
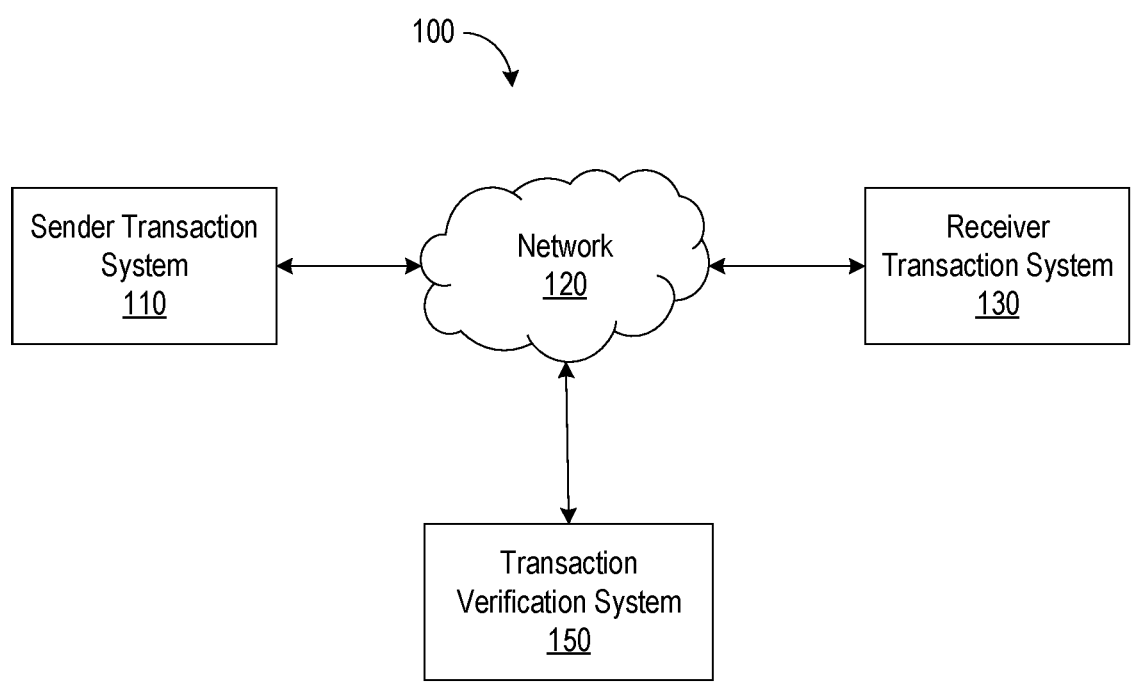
FIG. 1 is a block diagram of a system for conducting a transaction between a sender transaction system and a receiver transaction system, according to some arrangements.

FIG. 1 is a block diagram of a system for conducting a transaction between a sender transaction system and a receiver transaction system, according to some arrangements. The system 100 includes at least a sender transaction system 110, a receiver transaction system 130, a transaction verification system 150, and a network 120. Each of the sender transaction system 110, receiver transaction system 130, and transaction verification system 150 is a computing system having processing, storage, and networking capabilities for conducting an EEPS transaction. In some arrangements, one or both of the sender transaction system 110 and the receiver transaction system 130 can be a terminal (e.g., a payment processor, a bank, etc.). In other arrangements, one or both of the sender transaction system 110 and the receiver transaction system 130 can be an Internet connected computing device (e.g., a computer, smartphone, etc.). In some arrangements, the transaction verification system 150 can be a TPS (e.g., a payment processing system, etc.). In some arrangements, the transaction verification system 150 can be any network-connected (e.g., Internet-connected) device that has a network address (e.g., a computer, smartphone, etc.) that is capable of verifying a transaction between two or more entities. In particular, the transaction verification system 150 can assign unique object identifiers to the sender transaction system 110 and the receiver transaction system 130. The sender transaction system 110 and the receiver transaction system 130 can engage in a transaction based on the unique object identifiers.

The transaction can include any type of exchange between the sender transaction system 110 and the receiver transaction system 130. Examples of transactions can include, but are not limited to, payments (e.g., transfers of money between bank accounts, credit card payments, wire transfers, etc.), messages (e.g., email or other electronic messages, etc.), contracts and negotiations (e.g., various offers and negotiations throughout a contract discussion), or any other type of transaction between entities.

The sender transaction system 110 is a system that can participate in a transaction via the transaction verification system 140. In some arrangements, the sender transaction system 110 initiates the transaction. In some arrangements, the sender transaction system 110 does not initiate the transaction. Examples of the sender transaction system 110 include, but are not limited to, a mobile device, a smartphone, a laptop computer, a tablet computer, a desktop computer, a point-of-sale (POS) device, an Automatic Teller Machine (ATM), and the like.

The receiver transaction system 130 is a system that can participate in a transaction via the transaction verification system 140. In some arrangements, the receiver transaction system 130 initiates the transaction. In some arrangements, the receiver transaction system 130 does not initiate the transaction. Examples of the receiver transaction system 130 include, but are not limited to, a mobile device, a smartphone, a laptop computer, a tablet computer, a desktop computer, a point-of-sale (POS) device, an Automatic Teller Machine (ATM), and the like.

The transaction verification system 150 is a system that can verify a transaction between the sender transaction system 110 and the receiver transaction system 130. The transaction verification system 150 receives information from the sender transaction system 110 and the receiver transaction system 130 via the network 120. In some arrangements where the information received from the sender transaction system 110 and the receiver transaction system 130 matches, the transaction verification system 150 verifies and approves the transaction. In some arrangements, where the information received from the sender transaction system 110 and the receiver transaction system 130 does not match, the transaction verification system 150 does not verify the transaction, and declines it.

The network 120 is any suitable Local Area Network (LAN), Wide Area Network (WAN), or a combination thereof. For example, the network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 120 is structured to permit the exchange of data, values, instructions, messages, and the like.

Figure 2A:
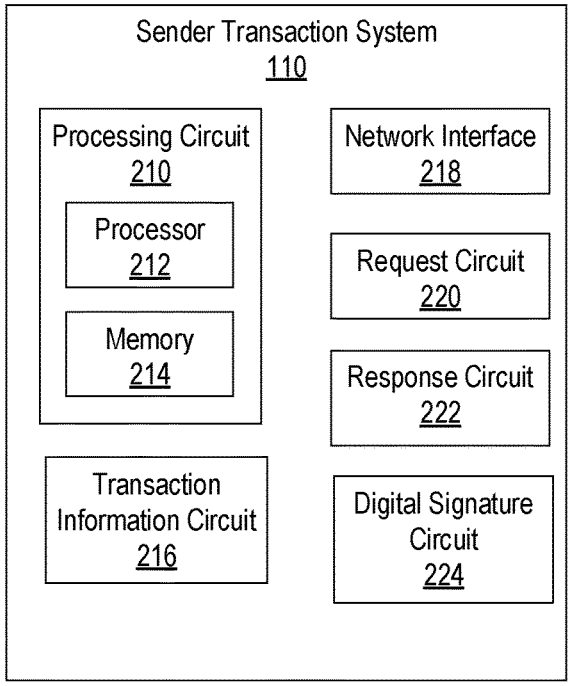
FIG. 2A is a block diagram of an example of the sender transaction system of the system set forth in FIG. 1, according to some arrangements.

FIG. 2A is a block diagram of an example of the sender transaction system 110 of the system set forth in FIG. 1, according to some arrangements. Referring to FIGS. 1-2A, the sender transaction system 110 is shown to include various circuits and logic for implementing the operations described herein. More particularly, the sender transaction system 110 includes one or more of a processing circuit 210, a transaction information circuit 216, a network interface 218, a request circuit 220, a response circuit 222, and a digital signature circuit 224. While various circuits, interfaces, and logic with particular functionality are shown, it should be understood that the sender transaction system 110 includes any number of circuits, interfaces, and logic for facilitating the operations described herein. For example, the activities of multiple circuits are combined as a single circuit and implement on the same processing circuit (e.g., the processing circuit 210), as additional circuits with additional functionality are included.

In some arrangements, the sender transaction system 110 includes a processing circuit 210 having a processor 212 and a memory 214. The processor 212 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 214 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 214 is or includes tangible, non-transient volatile memory or non-volatile memory. Accordingly, the memory 214 includes database components, object code components, script components, or any other type of information structure for supporting the various activities and information structures described herein.

The transaction information circuit 216 is configured to provide information required to conduct a transaction. In this regard, the transaction information circuit 216 is structured to exchange data, communications, instructions, etc., with an input/output component communicably coupled to the sender transaction system 110. Accordingly, in some arrangements, the input/output component can include a display device, touchscreen, keyboard, microphone, and the like. Examples of information required to conduct a transaction include, but are not limited to, payment amounts, bank routing numbers, bank account numbers, credit/debit card numbers, unique object identifiers (e.g., globally unique identification numbers for each entity that is part of a transaction, and the transaction itself), timestamps, and security measures (e.g., whether a digital signature is required to conduct the transaction). The transaction information circuit 216 is operatively coupled to one or more components of the sender transaction system 110. For example, the transaction information circuit 216 is operatively coupled to the request circuit 220 to provide the request circuit 220 with transaction information to be provided with a request.

The network interface 218 is configured for and structured to establish a connection with the receiver transaction system 130 and the transaction verification system 150 via the network 120. The network interface 218 is structured for sending and receiving data over a communication network (e.g., the network 120). Accordingly, the network interface 218 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The request circuit 220 is executed by the processing circuit 210 in some arrangements. The request circuit 220 can request a transaction in the manner described. The request circuit 220 can be provided in various manners. In some arrangements, the request circuit 220 is a server-based application that is executable on a device associated with the sender transaction system 110. In this regard, the user of the device has to download the request circuit 220 prior to usage. In some arrangements, the request circuit 220 is a web-based interface application provided by the transaction verification system 150. In this configuration, the user must log onto or otherwise access the web-based interface before usage. In this regard, the request circuit 220 is provided to the sender transaction system 110. In some arrangements, the request circuit 220 is coded into the memory 214 of the sender transaction system 110. All such variations and combinations are intended to fall within the spirit and scope of the present disclosure.

The request circuit 220 is operatively coupled to one or more of the components of the sender transaction system 110. For example, the request circuit 220 is operatively coupled to the network interface 218 for communicating with the transaction verification system 150. The request circuit 220, as facilitated by the network interface 218, can send a transaction request to the transaction verification system 150. In some arrangements, the request circuit 220 is coupled to an input/output device to display output and receive user input.

The response circuit 222 is executed by the processing circuit 210 in some arrangements. The response circuit 222 can respond to a transaction request in the manner described. The response circuit 222 can be provided in various manners. In some arrangements, the response circuit 222 is a server-based application that is executable on a device associated with the sender transaction system 110. In this regard, the user of the device has to download the response circuit 222 prior to usage. In some arrangements, the response circuit 222 is a web-based interface application provided by the transaction verification system 150. In this configuration, the user must log onto or otherwise access the web-based interface before usage. In this regard, the response circuit 222 is provided to the sender transaction system 110. In some arrangements, the response circuit 222 is coded into the memory 214 of the sender transaction system 110. All such variations and combinations are intended to fall within the spirit and scope of the present disclosure.

The response circuit 222 is operatively coupled to one or more of the components of the sender transaction system 110. For example, the response circuit 222 is operatively coupled to the network interface 218 for communicating with the transaction verification system 150. The response circuit 222, as facilitated by the network interface 218, can send a response to a transaction to the transaction verification system 150. In some arrangements, the response circuit 222 is coupled to an input/output device to display output and receive user input.

The digital signature circuit 224 is executed by the processing circuit 210, in some arrangements. In some arrangements, the digital signature circuit 224 can protect data provided in the transaction information circuit 216 by encrypting the data. The digital signature circuit 224 can encrypt the data using any known encryption methods (e.g., Advanced Encryption Standard (AES), Triple Data Encryption Standard (3DES), Twofish, or any other know method) such that the data is secure. Accordingly, the digital signature circuit 224 is in communication with the transaction information circuit 216 and the request circuit 220 such that the data can be appropriately secured.

Figure 2B:
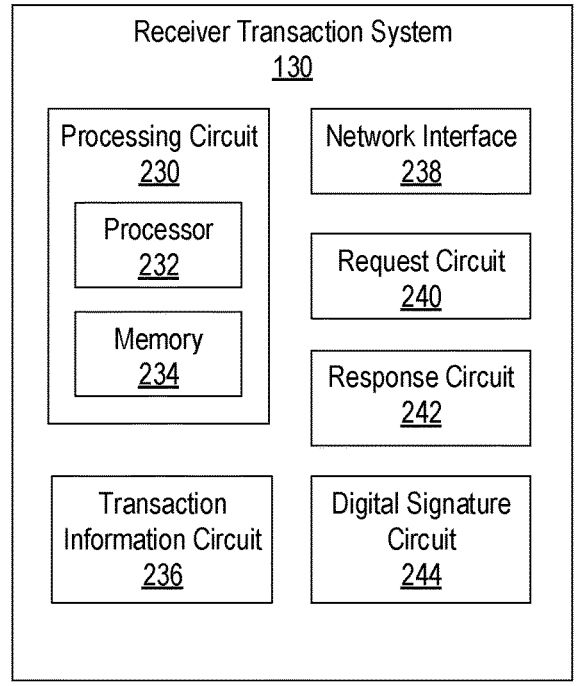
FIG. 2B is a block diagram of an example of the receiver transaction system of the system set forth in FIG. 1, according to some arrangements.

FIG. 2B is a block diagram of an example of the receiver transaction system 130 of the system set forth in FIG. 1, according to some arrangements. Referring to FIGS. 1-2B, the receiver transaction system 130 is shown to include various circuits and logic for implementing the operations described herein. More particularly, the receiver transaction system 130 includes one or more of a processing circuit 230, a transaction information circuit 236, a network interface 238, a request circuit 240, a response circuit 242, and a digital signature circuit 244. While various circuits, interfaces, and logic with particular functionality are shown, it should be understood that the receiver transaction system 130 includes any number of circuits, interfaces, and logic for facilitating the operations described herein. For example, the activities of multiple circuits are combined as a single circuit and implement on the same processing circuit (e.g., the processing circuit 230), as additional circuits with additional functionality are included.

In some arrangements, the sender transaction system 110 includes a processing circuit 230 having a processor 232 and a memory 234. The processor 232 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 234 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 234 is or includes tangible, non-transient volatile memory or non-volatile memory. Accordingly, the memory 234 includes database components, object code components, script components, or any other type of information structure for supporting the various activities and information structures described herein.

The transaction information circuit 236 is configured to provide information required to conduct a transaction. In this regard, the transaction information circuit 236 is structured to exchange data, communications, instructions, etc., with an input/output component communicably coupled to the receiver transaction system 130. Accordingly, in some arrangements, the input/output component can include a display device, touchscreen, keyboard, microphone, and the like. Examples of information required to conduct a transaction include, but are not limited to, payment amounts, bank routing numbers, bank account numbers, credit/debit card numbers, unique object identifiers (e.g., globally unique identification numbers for each entity that is part of a transaction, and the transaction itself), timestamps, and security measures (e.g., whether a digital signature is required to conduct the transaction).

The transaction information circuit 236 is operatively coupled to one or more components of the receiver transaction system 130. For example, the transaction information circuit 236 is operatively coupled to the response circuit 242 to provide the response circuit 242 with transaction information to be provided with a response.

The network interface 238 is configured for and structured to establish connection with the sender transaction system 110 and the transaction verification system 150 via the network 120. The network interface 238 is structured for sending and receiving of data over a communication network (e.g., the network 120). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The request circuit 240 is executed by the processing circuit 230 in some arrangements. The request circuit 240 can request a transaction in the manner described. The request circuit 240 can be provided in various manners. In some arrangements, the request circuit 240 is a server-based application that is executable on a device associated with the receiver transaction system 130. In this regard, the user of the device has to download the request circuit 240 prior to usage. In some arrangements, the request circuit 240 is a web-based interface application provided by the transaction verification system 150. In this configuration, the user must log onto or otherwise access the web-based interface before usage. In this regard, the request circuit 240 is provided to the receiver transaction system 130. In some arrangements, the request circuit 240 is coded into the memory 234 of the receiver transaction system 130. All such variations and combinations are intended to fall within the spirit and scope of the present disclosure.

The request circuit 240 is operatively coupled to one or more of the components of the receiver transaction system 130. For example, the request circuit 240 is operatively coupled to the network interface 238 for communicating with the transaction verification system 150. The request circuit 240, as facilitated by the network interface 238, can send a transaction request to the transaction verification system 150. In some arrangements, the request circuit 240 is coupled to an input/output device to display output and receive user input.

The response circuit 242 is executed by the processing circuit 210 in some arrangements. The response circuit 242 can respond to a transaction request in the manner described. The response circuit 242 can be provided in various manners. In some arrangements, the response circuit 242 is a server-based application that is executable on a device associated with the sender transaction system 110. In this regard, the user of the device has to download the response circuit 242 prior to usage. In some arrangements, the response circuit 242 is a web-based interface application provided by the transaction verification system 150. In this configuration, the user must log onto or otherwise access the web-based interface before usage. In this regard, the response circuit 242 is provided to the receiver transaction system 130. In some arrangements, the response circuit 242 is coded into the memory 234 of the receiver transaction system 130. All such variations and combinations are intended to fall within the spirit and scope of the present disclosure.

The response circuit 242 is operatively coupled to one or more of the components of the receiver transaction system 130. For example, the response circuit 242 is operatively coupled to the network interface 218 for communicating with the transaction verification system 150. The response circuit 242, as facilitated by the network interface 238, can send a response to a transaction to the transaction verification system 150. In some arrangements, the response circuit 242 is coupled to an input/output device to display output and receive user input.

The digital signature circuit 244 is executed by the processing circuit 230, in some arrangements. In some arrangements, the digital signature circuit 244 can protect data provided in the transaction information circuit 236 by encrypting the data. The digital signature circuit 244 can encrypt the data using any known encryption methods (e.g., Advanced Encryption Standard (AES), Triple Data Encryption Standard (3DES), Twofish, or any other know method) such that the data is secure. Accordingly, the digital signature circuit 244 is in communication with the transaction information circuit 236 and the request circuit 240 such that the data can be appropriately secured.

Figure 2C:
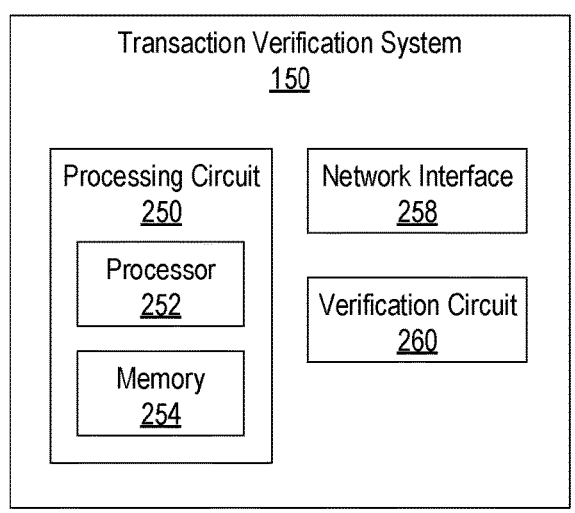
FIG. 2C is a block diagram of an example of the transaction verification system of the system set forth in FIG. 1, according to some arrangements.

FIG. 2C is a block diagram of an example of the transaction verification system 150 of the system set forth in FIG. 1, according to some arrangements. Referring to FIGS. 1-2C, the transaction verification system 150 is shown to include various circuits and logic for implementing the operations described herein. More particularly, the transaction verification system 150 includes one or more of a processing circuit 250, a network interface 258, and a verification circuit 260. While various circuits, interfaces, and logic with particular functionality are shown, it should be understood that the transaction verification system 150 includes any number of circuits, interfaces, and logic for facilitating the operations described herein. For example, the activities of multiple circuits are combined as a single circuit and implement on the same processing circuit (e.g., the processing circuit 250), as additional circuits with additional functionality are included.

In some arrangements, the transaction verification system 150 includes a processing circuit 250 having a processor 252 and a memory 254. The processor 252 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 254 (e.g., Random Access Memory (RAM), Read-Only Memory (ROM), Non-volatile RAM (NVRAM), Flash Memory, hard disk storage, etc.) stores data and/or computer code for facilitating the various processes described herein. Moreover, the memory 254 is or includes tangible, non-transient volatile memory or non-volatile memory. Accordingly, the memory 254 includes database components, object code components, script components, or any other type of information structure for supporting the various activities and information structures described herein.

The network interface 258 is configured for and structured to establish connection with the sender transaction system 110 and the receiver transaction system 130. The network interface 258 is structured for sending and receiving of data over a communication network (e.g., the P2P network). Accordingly, the network interface 258 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The verification circuit 260 is executed by the processing circuit 250, in some arrangements. The verification circuit 260 can receive transaction information from both the sender transaction system 110 and the receiver transaction system 130 and determine if the transaction should be completed. For example, in some arrangements the verification circuit 260 can receive a request for payment initiated by the sender transaction system 110 and sent to the receiver transaction system 130. The request for payment can include transaction data from the transaction information circuit 216. The verification circuit 150 can subsequently receive a response to the payment request from the receiver transaction system 130, and the response can include transaction data from the transaction information circuit 236. The verification circuit 150 compares the transaction data received from the sender transaction system 110 and the receiver transaction system 130. If the transaction data match, the transaction verification system 150 approves the transaction and allows it to proceed. If the transaction data do not match, the transaction verification system 150 does not approve the transaction and prevents it from proceeding.

Figure 3:
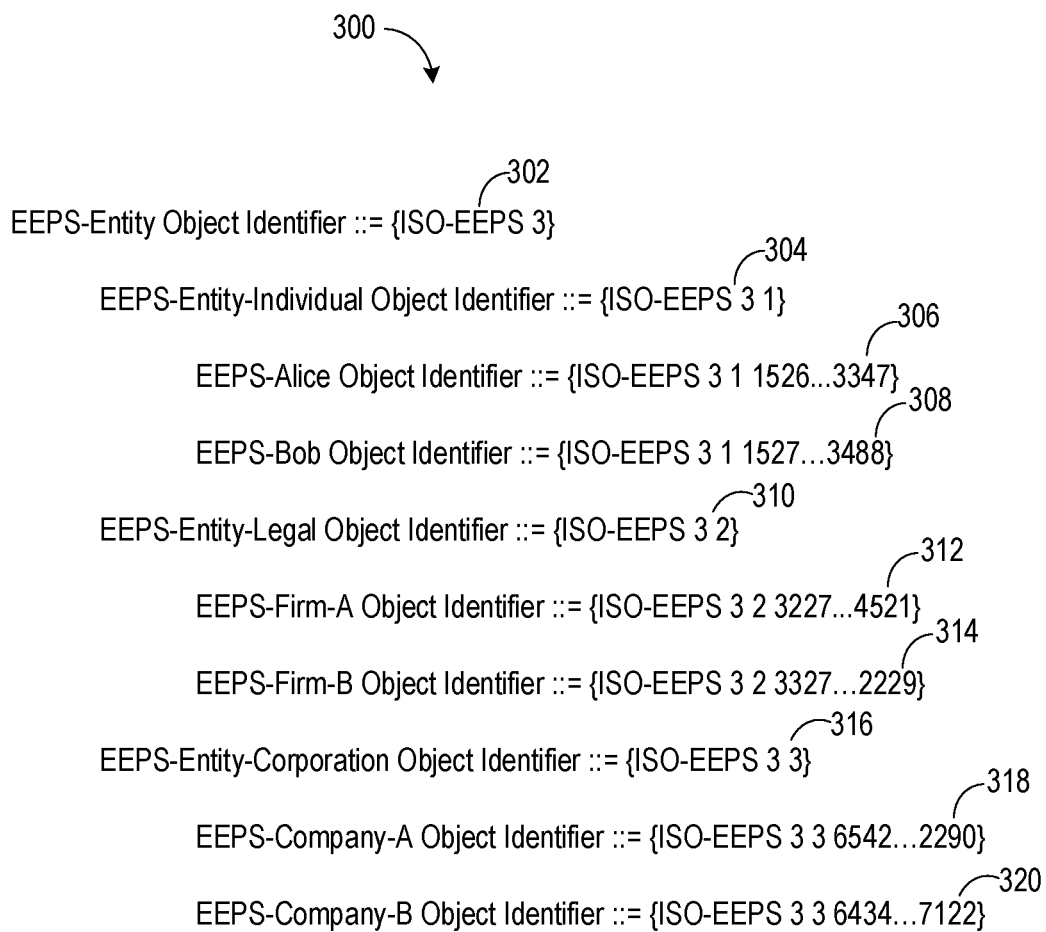
FIG. 3 is an illustration of the hierarchy of entity object identifiers, according to various arrangements.

FIG. 3 is an illustration of a hierarchy 300 of entity object identifiers, according to various arrangements. As used herein, the term "object identifier" (OID) refers to a combination of numbers and/or letters that identifies a single entity in the world. Examples of entities include, but are not limited to, an individual, a group of individuals, a company, a partnership, a not for profit organization, a religious group, and any other type of entity that can be identified. Different object identifier naming conventions are implemented by different organizations. For example, the International Standards Organization (ISO) has implemented an OID tree that is represented by a series of integers separated by periods, and the integers correspond to the path from the root to the entity. As another example, the International Telecommunications Standardization Sector has also implemented an OID convention, commonly referred to as the X-9 convention, which also includes a series of integers separated by periods. In some instances, an OID can be a combination of the ISO and X-9 conventions, referred to as a joint ISO-ITU convention. For example, the OID for Company X under the joint ISO-ITU convention is 2.16.840.1.114171, where "2" indicates the joint convention, "16" indicates a country, "840" indicates the United States, "1" indicates an organization, and "114171" indicates Company X. Implementing such conventions can provide for any entity having a unique number such that, when sending electronic messages, the sender and receiver are uniquely identified. However, multiple naming conventions can create difficulties when entities attempt to exchange messages across the different naming formats. Arrangements described herein provide for a schema (e.g., EEPS) that can eliminate difficulties encountered when sending messages across different naming conventions. EEPS can normalize messages from entities under different naming conventions such that communications between such entities is seamless.

As shown, the hierarchy 300 includes an entity object identifier (EOID) 302, which includes an initial ISO-EEPS notation. As used herein, the term "ISO-EEPS" denotes that the hierarchy 300 includes entities typically under the ISO naming convention. In some arrangements, the term ISO- EEPS can be used. However, in some arrangements other terms and/or numbers can be used. For example, any other unique combination of letters and/or numbers can be used to indicate that the entity referred to in the transaction is named under the ISO convention. Other naming conventions (e.g., X-9, ISO-ITU, etc.) can have other unique combinations of letters and/or numbers.

The EOID 302 is shown as {ISO-EEPS 3}, where "ISO-EEPS" denotes the ISO naming convention and "3" denotes an entity (e.g., an individual, a corporation, a partnership, etc.). As described, the letters and/or numbers used herein to provide for identification of entities are for example purposes only. In practice, any combination of letters and/or numbers that provides for unique identification of entities can be used. The EOID 302 is the top level of the hierarchy 300, meaning that all entity names under the EEPS naming convention (e.g., schema), fall under the EOID 302. In other words, the EOID 302 is the first node in a tree of entity names, and all other nodes to define entity names originate from the EOID 302. The EOID 302 further includes an entity individual object identifier (EIOID) 304, an entity legal object identifier (ELOID) 310, and an entity corporation object identifier (ECOID) 316.

The EIOID 304 is located at the level immediately below the EOID 302 (e.g., the second level of the hierarchy 300), and denotes the entity type as an individual. As shown, the EIOID 304 is {ISO-EEPS 3 1}, with the "1" indicating that the entity is an individual. However, as described, the letters and/or numbers used herein are for example purposes only, and any unique combination of letters and/or numbers can be used. The EIOID 304 further includes an Alice object identifier (AOID) 306 and a Bob object identifier (BOID) 308.

The AOID 306 is located at the level immediately below the EIOID 304 (e.g., the third level of the hierarchy 300), and denotes the unique ID of the individual named Alice. As shown, the AOID 306 is {ISO-EEPS 3 1 1526 . . . 3347}, with the "1526 . . . 3347" indicating the unique global identification number of Alice. The actual length of the unique global identification number of Alice can vary. In some arrangements, the length of the unique global identification number is a 128-bit number (e.g., $10^{39}$ digits). Including a unique global identification number of such a length virtually guarantees that each individual in the world has a unique global identification number. Because there are less than 8 billion people in the world (e.g., $10^9$), a 128-bit global unique identification number can support far more global identification numbers than individuals in the world. In some arrangements, the devices (e.g., mobile phone, computer, television, tablet, etc.) owned by the individual may have a unique global identification number. For example, Alice may own a mobile phone, a table, a computer, and two televisions. Alice may therefore have five different unique global identification numbers that identify her because electronic messages from Alice may originate from any of those devices. For example, Alice may initiate a transaction from her television to rent a movie, and she may initiate a transaction from her mobile phone to purchase an application. Each transaction is attributed to Alice by way of the global unique identification number for each device that Alice owns.

The BOID 308 is also located at the level immediately below the EIOID 304 (e.g., the third level of the hierarchy 300), and denotes the unique ID of the individual named Bob. As shown the BOID 308 is {ISO-EEPS 3 1 1527 . . . 3488}, with the "1527 . . . 3348" indicating the unique global identification number of Bob. The actual length of the unique global identification number of Bob can vary, as described.

As shown, the EIOID 304 includes the AOID 304 and the BOID 306. However, in some arrangements, the EIOID includes the unique global identification number for every individual in the world. In some arrangements, the EIOID includes the unique global identification number for every device owned by every individual in the world such that an electronic transaction (e.g., an electronic message, an electronic payment, or other electronic communication) originating from a device is attributed to the individual that owns the device.

The ELOID 310 is located at the level immediately below the EOID 302 (e.g., the second level of the hierarchy 300), and denotes the entity type as a legal entity (e.g., a legal services firm, partnership, corporation, etc.). As shown, the ELOID 310 is {ISO-EEPS 3 2}, with the "2" indicating that the entity is a legal entity. However, as described, the letters and/or numbers used herein are for example purposes only, and any unique combination of letters and/or numbers can be used. The ELOID 310 further includes a Firm A object identifier (FAOID) 312 and a Firm B object identifier (FBOID) 314.

The FAOID 312 is located at the level immediately below the ELOID 310 (e.g., the third level of the hierarchy 300), and denotes the unique ID of the legal services Firm A. As shown, the FAOID 312 is {ISO-EEPS 3 2 3227 . . . 4521}, with the "3227 . . . 4521" indicating the unique global identification number of Firm A. The actual length of the unique global identification number of Firm A can vary. In some arrangements, the length of the unique global identification number is a 128-bit number (e.g., $10^{39}$ digits). Including a unique global identification number of such a length virtually guarantees that each legal services firm in the world has a unique global identification number, as there are far less than $10^{39}$ legal services firms in the world. In some arrangements, the devices (e.g., mobile phone, computer, television, tablet, etc.) owned by Firm A may have a unique global identification number. For example, Firm A may numerous mobile phone, computers, tablets, etc. Firm A may therefore have numerous different unique global identification numbers that identify it because electronic messages from Firm A may originate from any of those devices. For example, Firm A may initiate a transaction from a computer to sign a contract, and it may initiate a transaction from a mobile phone to purchase software. Each transaction is attributed to Firm A by way of the global unique identification number for each device that Firm A owns.

The FBOID 314 is also located at the level immediately below the ELOID 310 (e.g., the third level of the hierarchy 300), and denotes the unique ID of the legal services firm named Firm B. As shown the FBOID 308 is {ISO-EEPS 3 2 3327 . . . 2229}, with the "3327 . . . 2229" indicating the unique global identification number of Firm B. The actual length of the unique global identification number of Firm B can vary, as described.

As shown, the ELOID 310 includes the FAOID 312 and the FBOID 314. However, in some arrangements, the ELOID 310 includes the unique global identification number for every legal services firm in the world. In some arrangements, the ELOID 310 includes the unique global identification number for every device owned by every legal services firm in the world such that an electronic transaction (e.g., an electronic message, an electronic payment, or other electronic communication) originating from a device is attributed to the legal services firm that owns the device.

The ECOID 316 is located at the level immediately below the EOID 302 (e.g., the second level of the hierarchy 300), and denotes the entity type as a corporate entity (e.g., a corporation, LLC, etc.). As shown, the ECOID 316 is {ISO-EEPS 3 3}, with the "3" indicating that the entity is a corporate entity. However, as described, the letters and/or numbers used herein are for example purposes only, and any unique combination of letters and/or numbers can be used. The ECOID 316 further includes a Company A object identifier (CAOID) 312 and a Company B object identifier (CBOID) 314.

The CAOID 318 is located at the level immediately below the ECOID 316 (e.g., the third level of the hierarchy 300), and denotes the unique ID of Company A. As shown, the CAOID 318 is {ISO-EEPS 3 3 6542 . . . 2290}, with the "6542 . . . 2990" indicating the unique global identification number of Company A. The actual length of the unique global identification number of Company A can vary. In some arrangements, the length of the unique global identification number is a 128-bit number (e.g., $10^{39}$ digits). Including a unique global identification number of such a length virtually guarantees that each corporation in the world has a unique global identification number, as there are far less than $10^{39}$ corporations in the world. In some arrangements, the devices (e.g., mobile phone, computer, television, tablet, etc.) owned by Company A may have a unique global identification number. For example, Company A may have numerous mobile phone, computers, tablets, etc. Company A may therefore have numerous different unique global identification numbers that identify it because electronic messages from Company A may originate from any of those devices. For example, Company A may initiate a transaction from a computer to sign a contract, and it may initiate a transaction from a mobile phone to purchase software. Each transaction is attributed to Company A by way of the global unique identification number for each device that Company A owns.

The CBOID 320 is also located at the level immediately below the ECOID 316 (e.g., the third level of the hierarchy 300), and denotes the unique ID of the legal services firm named Company B. As shown the CBOID 308 is {ISO-EEPS 3 3 6434 . . . 7122}, with the "6434 . . . 7122" indicating the unique global identification number of Company B. The actual length of the unique global identification number of Company B can vary, as described.

As shown, the ECOID 316 includes the CAOID 318 and the CBOID 320. However, in some arrangements, the ECOID 316 includes the unique global identification number for every corporation in the world. In some arrangements, the ECOID 316 includes the unique global identification number for every device owned by every company in the world such that an electronic transaction (e.g., an electronic message, an electronic payment, or other electronic communication) originating from a device is attributed to the corporation that owns the device.

Figure 4:
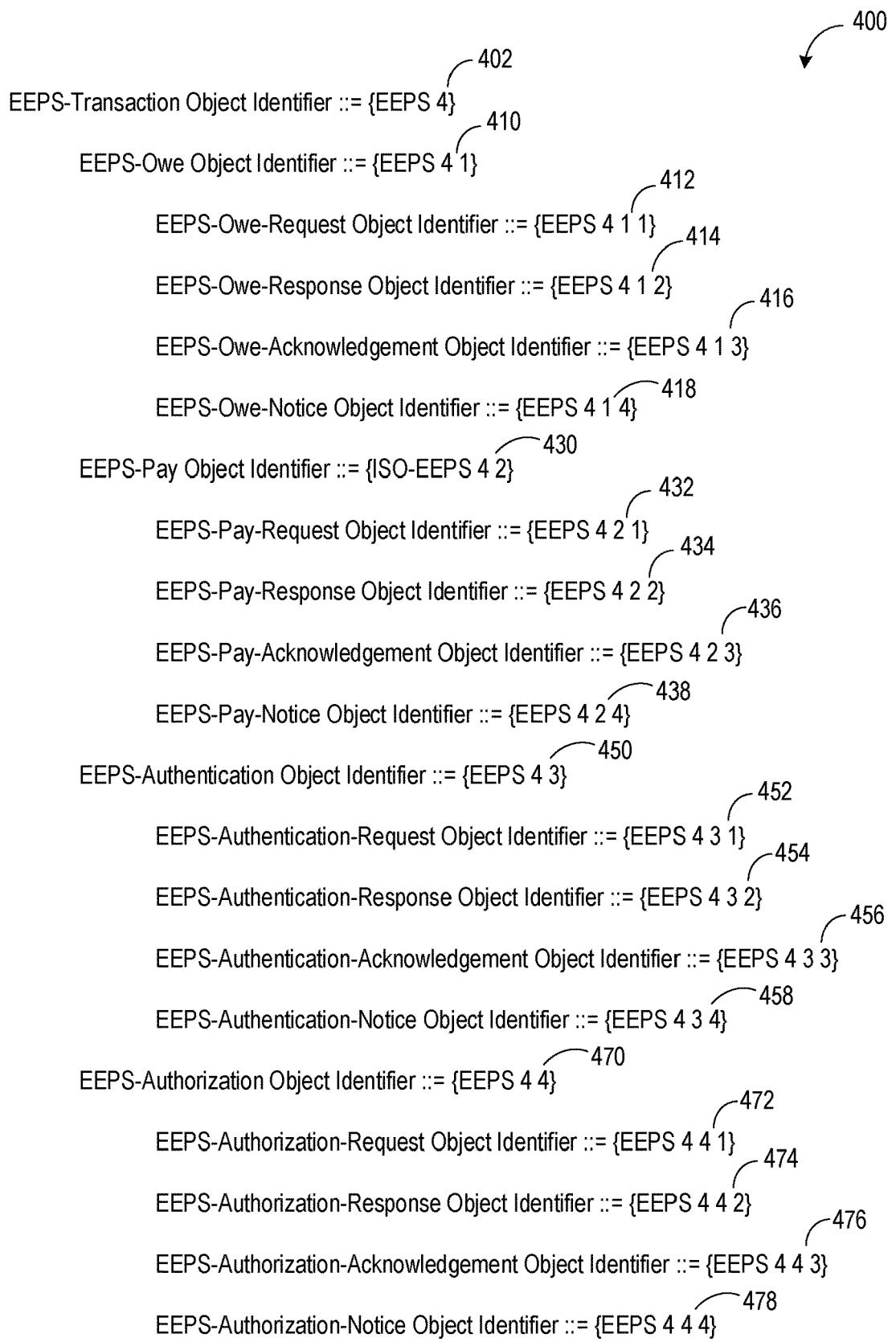
FIG. 4 is an illustration of the hierarchy of transaction object identifiers, according to various arrangements.

FIG. 4 is an illustration of the hierarchy 400 of transaction object identifiers, according to various arrangements. As described herein, the term "transaction object identifier" (TOID) refers to a combination of letters and/or numbers unique to a specific type of electronic transaction. As described herein, an "electronic transaction" refers to an electronic exchange of information. For example, an electronic transaction can include electronic payments, electronic messages regarding a contract negotiation, e-mail messages between different entities, or any other kind of electronic communication between parties or entities.

As shown, the hierarchy 400 includes a transaction object identifier (TOID) 402, which includes an initial EEPS notation. In some arrangements, the term EEPS can be used. However, in some arrangements other terms and/or numbers can be used. For example, any other unique combination of letters and/or numbers can be used to indicate that the entity referred to in the transaction is named under the EEPS convention. Other naming conventions (e.g., X-9, ISO-ITU, etc.) can have other unique combinations of letters and/or numbers.

The TOID 402 is shown as {EEPS 4}, where "EEPS" denotes the EEPS naming convention and "4" denotes an electronic transaction. As described, the letters and/or numbers used herein to provide for identification of entities are for example purposes only. In practice, any combination of letters and/or numbers that provides for unique identification of transactions can be used. The EOID 402 is the top level of the hierarchy 400, meaning that all transaction names under the EEPS naming convention (e.g., schema), fall under the TOID 302. In other words, the TOID 402 is the first node in a tree of transaction names, and all other nodes to define transaction names originate from the TOID 402. The TOID 402 further includes an owe object identifier (OOID) 410, a pay object identifier (POID) 430, an authentication object identifier (AUOID) 450, and an authorization object identifier (AZOID) 470.

The OOID 410 is located at the level immediately below the TOID 402 (e.g., the second level of the hierarchy 400), and denotes the transaction type as "owe". As used herein, the term "owe" refers to a determination that one entity owes a payment to another entity. As shown, the OOID 410 is {EEPS 4 1}, with the "1" indicating that transaction type is "owe." However, as described, the letters and/or numbers used herein are for example purposes only, and any unique combination of letters and/or numbers can be used. The OOID 410 further includes an owe request object identifier (OREQOID) 412, an owe response object identifier (ORESOID) 414, an owe acknowledgement object identifier (OAOID) 416, and an owe notice object identifier (ONOID) 418).

The OREQOID 412 is located at the level immediately below the OOID 410, and denotes the unique ID of the owe request for an electronic transaction. As shown, the OREQOID 412 is {EEPS 4 1 1}, with the last "1" indicating that the transaction type is an owe request. For example, one entity may send an owe request to another entity when money is owed, such as when payment is required for services rendered or products delivered. As described, the letters and/or numbers used herein are for example purposes only, and any unique combination of letters and/or numbers can be used.

The ORESOID 414 is located at the level immediately below the OOID 410, and denotes the unique ID of the owe response for an electronic transaction. As shown the ORESOID 414 is {EEPS 4 1 2}, with the "2" indicating that the transaction type is an owe response. For example, one entity may send an owe response to another entity when it receives the owe request from another entity. As described, the letters and/or numbers used herein are for example purposes only, and any unique combination of letters and/or numbers can be used.

The OAOID 416 is located at the level immediately below the OOID 410, and denotes the unique ID of the owe acknowledgment for an electronic transaction. As shown, the OAOID 416 is {EEPS 4 1 3}, with the "3" indicating that the transaction type is an owe acknowledgement. For example, one entity receives an owe acknowledgment to denote that the responding entity acknowledges receipt of the owe request. As described, the letters and/or numbers used here are for example purposes only, and any unique combination of letters and/or numbers can be used.

The ONOID 418 is located at the level immediately below the OOID 410, and denotes the unique ID of the notice for an electronic transaction. As shown, the ONOID 418 is {EEPS 4 1 4}, with the "4" indicating that the transaction type is a notice. For example, one entity may receive an owe notice response from a transaction verification system (e.g., the transaction verification system 150) that an electronic message regarding an owe notice was sent to another entity. As described, the letters and/or numbers used here are for example purposes only, and any unique combination of letters and/or numbers can be used.

The POID 430 is located at the level immediately below the TOID 402 (e.g., the second level of the hierarchy 400), and denotes the electronic transaction type as "pay". As used herein, the term "pay" refers to an electronic transaction associated with the exchange of money. As shown, the POID 430 is {EEPS 4 2}, with the "2" indicating that transaction type is "pay." However, as described, the letters and/or numbers used herein are for example purposes only, and any unique combination of letters and/or numbers can be used. The POID 430 further includes pay request object identifier (PREQOID) 432, a pay response object identifier (PRESOID) 434, a pay acknowledgement object identifier (PAOID) 436, and a pay notice object identifier (PNOID) 438.

The PREQOID 432 is located at the level immediately below the POID 430, and denotes the unique ID of the pay request for an electronic transaction. As shown, the PREQOID 432 is {EEPS 4 2 1}, with the "1" indicating that the transaction type is a pay request. For example, one entity may send a pay request to another entity when money is to be sent, such as when payment is required for services rendered or products delivered. As described, the letters and/or numbers used herein are for example purposes only, and any unique combination of letters and/or numbers can be used.

The PRESOID 434 is located at the level immediately below the POD 430, and denotes the unique ID of the pay response for an electronic transaction. As shown, the PRESOID 434 is {EEPS 4 2 2}, with the last "2" indicating that the transaction type is a pay response. For example, one entity may send a pay response to another entity when it receives the pay request from another entity. As described, the letters and/or numbers used herein are for example purposes only, and any unique combination of letters and/or numbers can be used.

The PAOID 436 is located at the level immediately below the POID 430, and denotes the unique ID of the owe acknowledgment for an electronic transaction. As shown, the PAOID 436 is {EEPS 4 2 3}, with the "3" indicating that the transaction type is a pay acknowledgement. For example, one entity receives a pay acknowledgement to denote that the responding entity acknowledges receipt of the pay request. As described, the letters and/or numbers used here are for example purposes only, and any unique combination of letters and/or numbers can be used.

The PNOID 438 is located at the level immediately below the POID 430, and denotes the unique ID of the pay notice for an electronic transaction. As shown, the PNOID 438 is {EEPS 4 2 4}, with the last "4" indicating that the transaction type is a pay notice. For example, one entity may receive a pay notice from a transaction verification system (e.g., the transaction verification system 150) that an electronic message regarding a pay notice was sent to another entity. As described, the letters and/or numbers used here are for example purposes only, and any unique combination of letters and/or numbers can be used.

The AUOID 450 is located at the level immediately below the TOID 402 (e.g., the second level of the hierarchy 400), and denotes the electronic transaction type as "authentication". As used herein, the term "authentication" refers to an electronic transaction wherein the exchange of information between two or more parties or entities is verified (e.g., authenticated) such that the information being provided by each sending entity is received by the desired receiving entity. As shown, the AUOID 450 is {EEPS 4 3}, with the "3" indicating that transaction type is "authentication." However, as described, the letters and/or numbers used herein are for example purposes only, and any unique combination of letters and/or numbers can be used. The AUOID 450 further includes an authentication request object identifier (AREQOID) 452, an authentication response object identifier (ARESOID) 454, an authentication acknowledgement object identifier (AUACOID) 456, and an authentication notice object identifier (AUNOID) 458.

The AREQOID 452 is located at the level immediately below the AUOID 450, and denotes the unique ID of the authentication request for an electronic transaction. As shown, the AREQOID 452 is {EEPS 4 3 1}, with the "1" indicating that the transaction type is an authentication request. For example, one entity may send an authentication request to another entity when money is to be sent, such as when payment is required for services rendered or products delivered, in order to verify that the payment will go to the correct entity. As described, the letters and/or numbers used herein are for example purposes only, and any unique combination of letters and/or numbers can be used.

The ARESOID 454 is located at the level immediately below the AUOID 450, and denotes the unique ID of the pay response for an electronic transaction. As shown, the ARESOID 454 is {EEPS 4 3 2}, with the "2" indicating that the transaction type is an authentication response. For example, one entity may send an authentication response to another entity when it receives the authentication request from another entity. As described, the letters and/or numbers used herein are for example purposes only, and any unique combination of letters and/or numbers can be used.

The AUACOID 456 is located at the level immediately below the AUOID 450, and denotes the unique ID of the owe acknowledgment for an electronic transaction. As shown, the AUACOID 456 is {EEPS 4 3 3}, with the second "3" indicating that the transaction type is an authentication acknowledgement. For example, one entity receives an authentication acknowledgement from a transaction verification system (e.g., the transaction verification system 150) to denote that the entities have been authenticated. As described, the letters and/or numbers used here are for example purposes only, and any unique combination of letters and/or numbers can be used.

The AUNOID 458 is located at the level immediately below the POID 450, and denotes the unique ID of the authentication notice for an electronic transaction. As shown, the AUNOID 458 is {EEPS 4 3 4}, with the last "4" indicating that the transaction type is an authentication notice. For example, one entity may receive an authentication notice from a transaction verification system (e.g., the transaction verification system 150) that an electronic message regarding an authentication notice was sent to another entity. As described, the letters and/or numbers used here are for example purposes only, and any unique combination of letters and/or numbers can be used.

The AZOID 470 is located at the level immediately below the TOID 402 (e.g., the second level of the hierarchy 400), and denotes the electronic transaction type as "authorization". As used herein, the term "authorization" refers to an electronic transaction wherein the exchange of information between two or more parties or entities is authorized (e.g., allowed to proceed) such that the information being provided by each sending entity is received by the desired receiving entity. As shown, the AUOID 450 is {EEPS 4 4}, with the second "4" indicating that transaction type is "authorization." However, as described, the letters and/or numbers used herein are for example purposes only, and any unique combination of letters and/or numbers can be used. The AZOID 470 further includes an authorization request object identifier (AZREQOID) 472, an authorization response object identifier (AZRESOID) 474, an authorization acknowledgement object identifier (AZACOID) 476, and an authorization notice object identifier (AZNOID) 478.

The AZREQOID 472 is located at the level immediately below the AZUOID 470, and denotes the unique ID of the authorization request for an electronic transaction. As shown, the AZREQOID 472 is {EEPS 4 4 1}, with the "1" indicating that the transaction type is an authorization request. For example, a transaction verification system (e.g., the transaction verification system 150) may send an authorization request to another entity when money is to be sent, such as when payment is required for services rendered or products delivered, in order to verify that the payment will go to the correct entity. As described, the letters and/or numbers used herein are for example purposes only, and any unique combination of letters and/or numbers can be used.

The AZRESOID 474 is located at the level immediately below the AZOID 470, and denotes the unique ID of the authorization response for an electronic transaction. As shown, the AZRESOID 474 is {EEPS 4 4 2}, with the "2" indicating that the transaction type is an authorization response. For example, one entity may send an authorization response to another entity when it receives the authorization request from another entity. As described, the letters and/or numbers used herein are for example purposes only, and any unique combination of letters and/or numbers can be used.

The AZACOID 476 is located at the level immediately below the AZUOID 470, and denotes the unique ID of the authorization acknowledgment for an electronic transaction. As shown, the AZACOID 476 is {EEPS 4 4 3}, with the "3" indicating that the transaction type is an authorization acknowledgement. For example, one entity receives an authorization acknowledgement from a transaction verification system (e.g., the transaction verification system 150) to denote that the transaction has been authorized. As described, the letters and/or numbers used here are for example purposes only, and any unique combination of letters and/or numbers can be used.

The AZNOID 478 is located at the level immediately below the AZOID 470, and denotes the unique ID of the authorization notice for an electronic transaction. As shown, the AZNOID 478 is {EEPS 4 4 4}, with the last "4" indicating that the transaction type is an authentication notice. For example, one entity may receive an authorization notice from a transaction verification system (e.g., the transaction verification system 150) that an electronic message regarding an authorization notice was sent to another entity. As described, the letters and/or numbers used here are for example purposes only, and any unique combination of letters and/or numbers can be used.

In some arrangements, the transaction object identifiers can include additional reference numbers such that each transaction has a globally unique object identifier. In such arrangements, each transaction can be separately identified from all other transactions in the world. For example, a unique payment request object identifier can be {EEPS 4 2 1 3487 . . . 9254} where "3487 . . . 9254" is a 128-bit number that is unique to the transaction.

Figure 5:
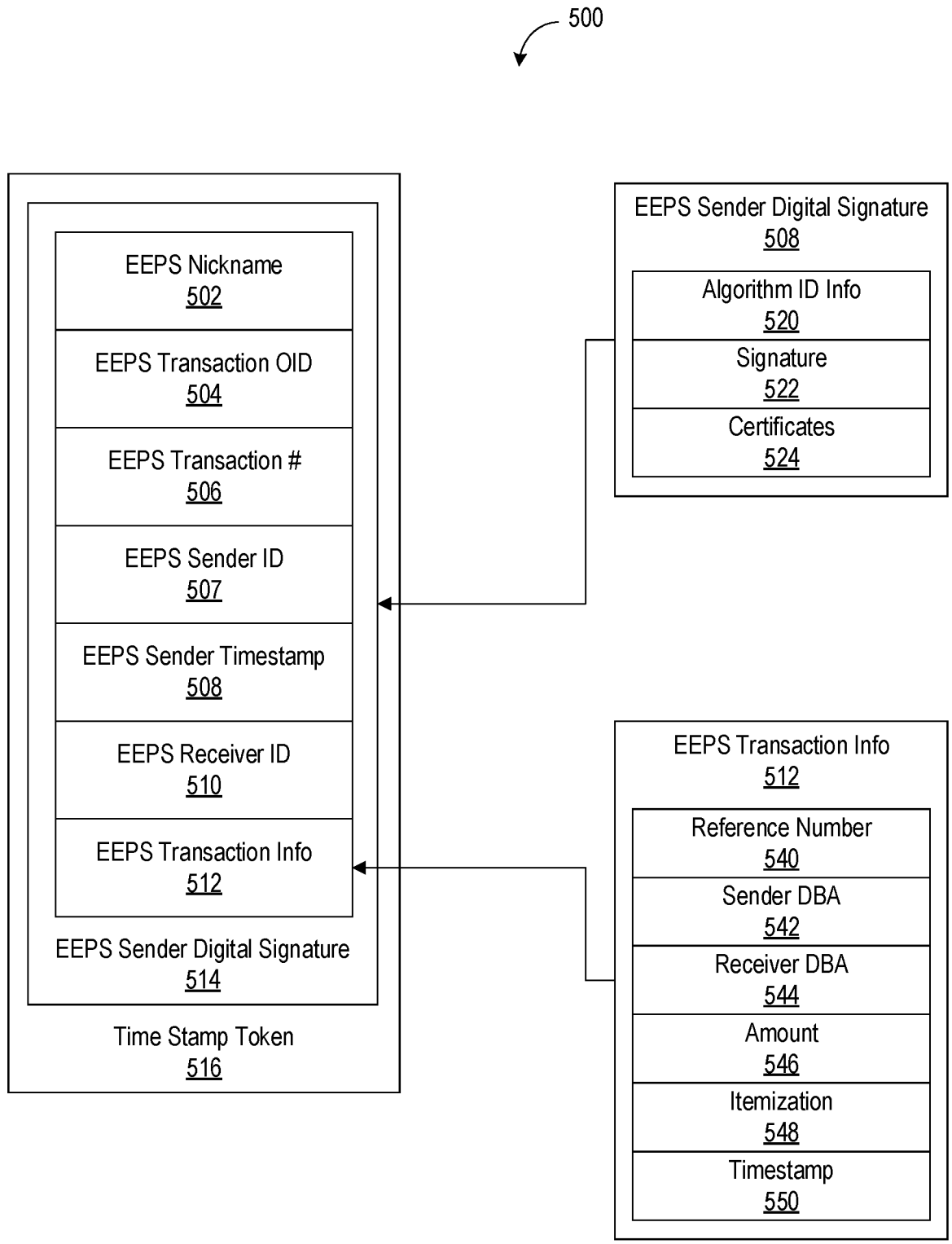
FIG. 5 is a block diagram of the format of an EEPS transaction, according to various arrangements.

FIG. 5 is a block diagram of the format of an EEPS transaction 500, according to various arrangements. As shown, the EEPS transaction 500 includes a nickname 502. The nickname 502 can be any kind of plain language name for a transaction that can describe the transaction. For example, for a transaction in which one entity pays another entity for services rendered related to cleaning, the nickname 502 can be "payment for cleaning services." The EEPS transaction 500 also includes an EEPS transaction object ID (TOID) 504. The TOID 504 indicates the type transaction based on the EEPS schema described in FIG. 4. For example, the TOID 504 for a payment request would be {EEPS 4 2 1}, as previously described.

The EEPS transaction 500 also includes a transaction number 506. The transaction number 506 can be any number associated with the transaction that the sender, the receiver, or both the sender and receiver can reference when referring to the transaction. The transaction number 506 can be a globally unique number such that the transaction is uniquely identifiable by the transaction number 506.

The EEPS transaction 500 also includes the sender ID 507. The sender ID 507 is a globally unique identification number that identifies the sender. For example, the sender ID 507 can be the same as the AOID 306 (e.g., "Alice") such that the receiving party to the transaction knows that the sender is Alice by referring to the sender ID 507. A sender timestamp 508 is also included in the EEPS transaction 500. In some arrangements, the sender timestamp 508 can be a local timestamp identifying the time at which the sender sent the payment request. In some arrangements, the sender timestamp 508 can be a network timestamp created using a network time protocol.

The EEPS transaction 500 also includes the receiver ID 510. The receiver ID 510 is a globally unique identification number that identifies the receiver. For example, the receiver ID 510 can be the same as the BOID 308 (e.g., "Bob") such that the sending party knows that the receiver is Bob by referring to the receiver ID 510.

Transaction information 512 is also included in the EEPS transaction 500. The transaction information 512 is generic information that is not necessarily unique to a specific transaction. The transaction information 512 includes a reference number 540, a sender business name 542, a receiver business name 544, an amount 546, an itemization 548, and a timestamp 550. The reference number 540 can be any number assigned by the sender, the receiver, or both the sender and the receiver. It is not a globally unique number and may be included in the transaction information 512 for convenience and/or ease or recording. For example, the sender may number each transaction chronologically, by referencing the date on which the transaction occurred.

The sender business name 542 can be any name the sender chooses to use to conduct the transaction. Generally, to facilitate the ease of transactions, a sender can notify a transaction verification system (e.g., the transaction verification system 150) that the sender is "doing business as" (DBA) an entity under another name. Using a DBA, a sender is not required to create a new account for various transactions. The receiver business name 544 can be generated similarly to the sender business name 542. That is, the receiver business name 544 can also be created as a DBA for the receiver.

In some arrangements, where the electronic transaction is a payment between two parties, the transaction information 512 includes an amount 546, which details the amount of the transaction. The itemization 548 can be a list of products, services, or other items that are included as part of the transaction. For example, if one party is receiving goods and services as part of the transaction, the itemization 548 can provide a detailed list of the goods and services included in the transaction. The timestamp 550 can be a local timestamp identifying the time at which the transaction information 512 was included in the transaction 500.

In some arrangements, the transaction information 512 can include any other information that would be relevant to the transaction or would facilitate the transaction. For example, the transaction information 512 could include an entire message based on another message type (e.g., ISO 8583, ISO 2022, JSON, or other message types). The entire message can be placed into the transaction information 512 such that the original message can be transmitted via the universal EEPS schema.

The transaction 500 also includes the sender digital signature 514. The digital signature 514 can ensure the messages sent between the sender and the receiver remain secure. The digital signature 514 includes algorithm information 520, a signature 522, and certificates 524. The algorithm information 520 can include the algorithm parameters used to create the digital signature 514. For example, the digital signature 514 can be created by using Secure Hash Algorithm 2 (SHA-2) with a specified key length of 2,048, along with a wide variety of parameters that can be shared across users.

The signature 522 is created by the sender when the transaction message is generated. The signature 522 can be based on any known formula used to create a signature. For example, the signature 522 can be created using the Rivest-Shamir-Adleman (RSA) algorithm. The certificates 524 include information about the digital signature 508, information about the identity of the subject owner of the certificate, and digital signature of an entity that can verify a transaction (e.g., the transaction verification system 150).

The EEPS transaction 500 also includes a time stamp token 516. The time stamp token 516 records the date and time the EEPS transaction 500 was created, so as to provide assurance of when the EEPS transaction 500 was created for record keeping purposes.

FIG. 6 is a block diagram of an example of storing EEPS transactions in a blockchain 600, according to various arrangements. In some arrangements, the blockchain 600 includes blocks 610-660, with each block corresponding to a message from a transaction. For example, a first transaction includes a payment request, and the payment request data is written (e.g., recorded) to block 610. After the first transaction payment request is added to the blockchain 600, a second transaction including a payment request is initiated, and the payment request data is written to the block 620. Because the block 620 is the block in the blockchain 600 that was added immediately after the block 610, the block 620 includes a hash that links the block 620 to the block 610 to maintain the structure of the blockchain 600.

Subsequently, the response to the first transaction payment request is written to the block 630. Because the block 630 and the block 610 both contain information for the first transaction, the block 630 includes a hash link 615 that links the block containing the response (e.g., the block 630) to the block containing the request (e.g., the block 610). The Block 630 is also hash-linked to the block 620, as the block 620 is the block in the blockchain 600 entered immediately before the block 630.

Next, a third transaction is initiated, and the third transaction includes a payment request. The data for the payment request for the third transaction is written to the blockchain 600 in the block 640, which is hash-linked to the block 630. Subsequently, the response to the second transaction request is recorded in the block 650, which is hash-linked to the block 640. The block 650 is also linked to the block 620 by the hash-link 635 because both the block 650 and the block 620 contain information for the second transaction.

Last, a response to the third transaction request is recorded in the block 660, and the block 660 is hash-linked to the block 650 to maintain the structure of the blockchain 600. The block 660 is also hash-linked to the block 640 via the hash-link 645 because both the block 660 and the block 640 contain information for the third transaction.

As shown, the blockchain 600 can include multiple hash-links between blocks. The blockchain 600 includes the conventional hash-links between adjacent blocks to maintain the structure of the blockchain 600. The blockchain 600 also includes hash-links between blocks containing information for specific transactions such that the progression of a transaction can be tracked by following the hash-links to the blocks containing information for the transaction. For example, a user examining the first transaction could view the response in the block 630 and then follow the hash-link 615 to find the transaction request in the block 610.

FIG. 7 is a block diagram of another example of storing EEPS transactions in a blockchain 700, according to various arrangements. In some arrangements, the blockchain 700 includes blocks 710, 730, and 750, with each block corresponding to a transaction. For example, the block 710 is contains information for a first transaction, the block 730 contains information for a second transaction, and the block 750 contains information for a third transaction. The block 730 is linked to the block 710 via the hash-link 720, and the block 750 is linked to the block 730 via the hash-link 740 such that the order of the blocks 710, 730, and 750 is maintained in the blockchain 700.

The block 710 contains information for a first transaction and includes sub-blocks 712 and 714. Sub-block 712 includes data related to a request for a first transaction. For example, the sub-block 712 can include data related to a payment request. Sub-block 714 includes data related to a response for a first transaction. For example, the sub-block 714 can include data related to a payment response. As additional messages containing information for the first transaction are generated, those messages will be included in the block 710 as additional sub-blocks such that all of the messages containing information for the first transaction are located in the block 710. The block 710 also includes one or more timestamp tokens 716. In some arrangements, the block 710 includes one timestamp token 716 that denotes the time at which the latest message was added to the block 710. In some arrangements, the block 710 includes a timestamp token 716 for each message that is added to the block 710 so as to provide a timeline associated with the messages entering the block 710.

The block 730 contains information for a second transaction and includes sub-blocks 732 and 734. Sub-block 732 includes data related to a request for a second transaction. For example, the sub-block 732 can include data related to a payment request. Sub-block 734 includes data related to a response for a second transaction. For example, the sub-block 734 can include data related to a payment response. As additional messages containing information for the second transaction are generated, those messages will be included in the block 730 as additional sub-blocks such that all of the messages containing information for the second transaction are located in the block 730. The block 730 also includes one or more timestamp tokens 736. In some arrangements, the block 730 includes one timestamp token 736 that denotes the time at which the latest message was added to the block 730. In some arrangements, the block 730 includes a timestamp token 736 for each message that is added to the block 730 so as to provide a timeline associated with the messages entering the block 730.

The block 750 contains information for a third transaction and includes sub-blocks 752 and 754. Sub-block 752 includes data related to a request for a third transaction. For example, the sub-block 752 can include data related to a payment request. Sub-block 754 includes data related to a response for a third transaction. For example, the sub-block 754 can include data related to a payment response. As additional messages containing information for the third transaction are generated, those messages will be included in the block 750 as additional sub-blocks such that all of the messages containing information for the third transaction are located in the block 750. The block 750 also includes one or more timestamp tokens 756. In some arrangements, the block 750 includes one timestamp tokens 756 that denotes the time at which the latest message was added to the block 750. In some arrangements, the block 750 includes a timestamp token 756 for each message that is added to the block 750 so as to provide a timeline associated with the messages entering the block 750.

The block 750 is linked to the block 730 via the hash-link 740. The block 730 is linked to the block 710 via the hash-link 720. The hash-link 740 and the hash-link 720 serve to maintain the order of blocks in the blockchain 700. As additional transactions are conducted, blocks including information related to those transactions will be added to the end of the blockchain 700 and hash-linked to the previous block in the blockchain 700.

Figure 8:
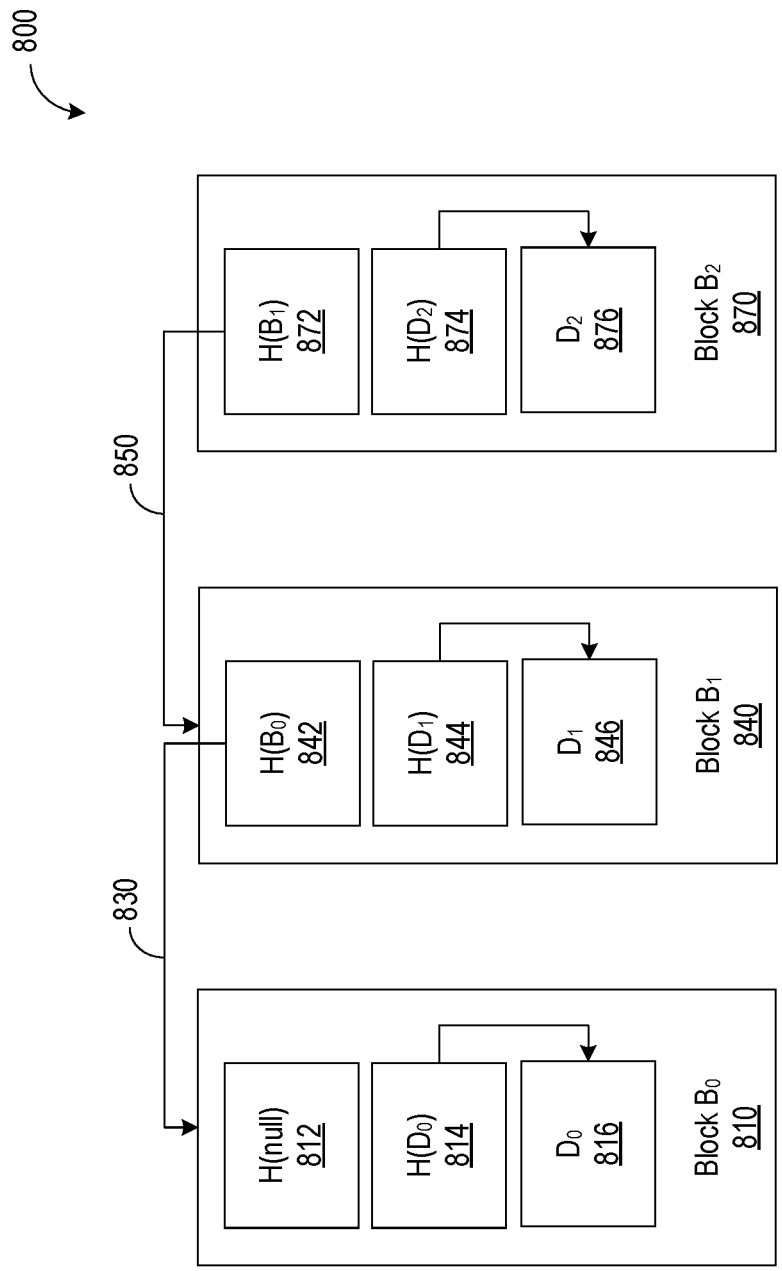
FIG. 8 is a block diagram of an example of storing EEPS transactions in a blockchain, according to various arrangements.

FIG. 8 is a block diagram of an example of storing EEPS transactions in a blockchain 800, according to various arrangements. In some arrangements, the blockchain 800 includes a block $B_0$ 810, a block $B_1$ 840, and a block $B_2$ 870, with each block corresponding to a message from a transaction. For example, the block $B_0$ 810 may include a payment request message for a first transaction, the block $B_1$ 840 may include a payment response message for the first transaction, and the block $B_2$ 870 may include an authentication message for the first transaction.

The block $B_0$ 810 is the first block in the blockchain 800, and includes H(null) 812, a hash $H(D_0)$ 814, and data $D_0$ 816. H(null) 812 is a hash function. Generally, in a blockchain the hash function will point to the previous block in the blockchain. However, because the block $B_0$ 810 is the first block in the blockchain 800, H(null) 812 does not point to any other blocks in the blockchain 800. $D_0$ 816 is the data included with the payment request message. For example, $D_0$ 816 may include the sender ID, the receiver ID, the payment amount, and any other information that may be relevant to the payment transaction. $H(D_0)$ 814 is a hash of the data $D_0$ 816 such that the block $B_0$ 810 includes both the data $D_0$ 816 and the hash $H(D_0)$ 814 of the data $D_0$ 816. Including the hash $H(D_0)$ 814 of the data $D_0$ 816 within the block $B_0$ 810 provides an additional way to protect the data within the block $B_0$ 810.

Block $B_1$ 840 is the second block in the blockchain 800, and includes $H(B_0)$ 842, a hash $H(D_1)$ 844, and data $D_1$ 846. $H(B_0)$ 812 is a hash function that points to the previous block in the blockchain 800 (e.g., the block $B_0$ 810). $D_1$ 846 is the data included with the payment response message. For example, $D_1$ 846 may include the sender ID, the receiver ID, the payment amount, and any other information that may be relevant to the payment transaction. $H(D_1)$ 844 is a hash of the data $D_1$ 846 such that the block $B_1$ 840 includes both the data $D_1$ 846 and the hash $H(D_1)$ 844 of the data $D_1$ 846. Including the hash $H(D_1)$ 844 of the data $D_1$ 846 within the block $B_1$ 840 provides an additional way to protect the data within the block $B_1$ 840.

Block $B_2$ 870 is the third block in the blockchain 800, and includes $H(B_1)$ 872, a hash $H(D_2)$ 874, and data $D_2$ 876. $H(B_1)$ 872 is a hash function that points to the previous block in the blockchain 800 (e.g., the block $B_1$ 840). $D_2$ 876 is the data included with the payment authorization message. For example, $D_2$ 876 may include the sender ID, the receiver ID, the payment amount, and any other information that may be relevant to the payment transaction. $H(D_2)$ 874 is a hash of the data $D_2$ 876 such that the block $B_2$ 870 includes both the data $D_2$ 876 and the hash $H(D_2)$ 874 of the data $D_2$ 876. Including the hash $H(D_2)$ 874 of the data $D_2$ 876 within the block $B_2$ 870 provides an additional way to protect the data within the block $B_2$ 870.

Figure 9:
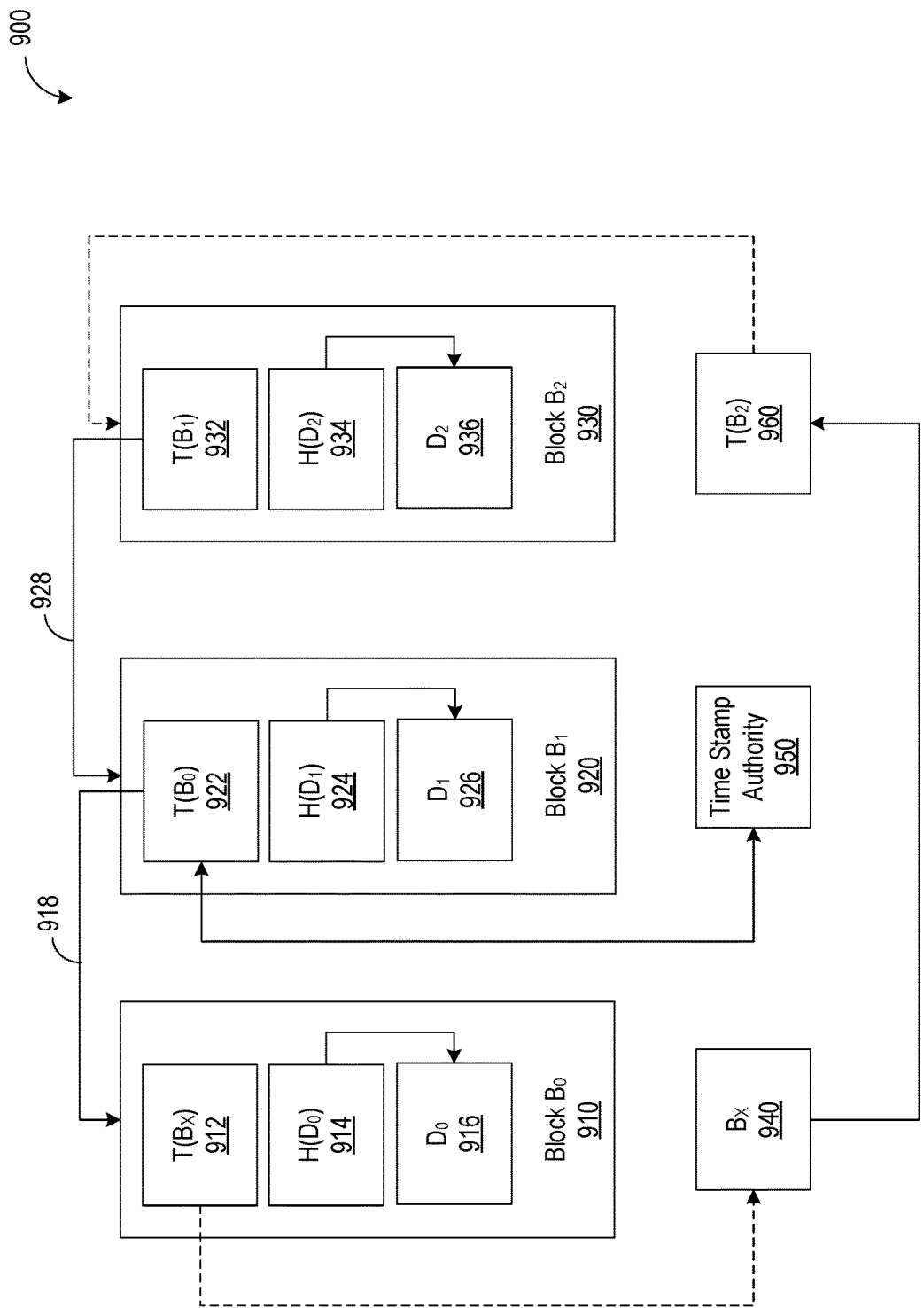
FIG. 9 is a block diagram of another example of storing EEPS transactions in a blockchain with a time stamp token, according to various arrangements.

FIG. 9 is a block diagram of another example of storing EEPS transactions in a blockchain 900 with a time stamp token, according to various arrangements. In some arrangements, the blockchain 900 includes a block $B_0$ 910, a block $B_2$ 920, and a block $B_3$ 930, with each block corresponding to a message from a transaction. For example, the block $B_0$ 910 may include a payment request message for a first transaction, the block $B_1$ 920 may include a payment response message for the first transaction, and the block $B_2$ 930 may include an authentication message for the first transaction.

The block $B_0$ 910 is the first block in the blockchain 900 and includes a time stamp $T(B_x)$ 912, a hash $H(D_0)$ 914, and data $D_0$ 916. In some arrangements, the time stamp $T(B_x)$ 912 records the date and time the block $B_0$ 910 was created, so as to provide for record keeping purposes. In some arrangements, the time stamp $T(B_x)$ 912 records the date and time each element in the block $B_0$ 910 was created, so as to provide for record keeping purposes. The time stamp $T(B_x)$ 912 is provided by a time stamp authority 950. The time stamp authority 950 is an entity that can provide for accurate and reliable time stamps such that the time stamps related to the transactions within the blockchain 900 are reliable.

The time stamp $T(B_x)$ 912 is associated with a system of record $(B_x)$ 940. The system of record $(B_x)$ 940 is a system that is able to validate the time stamp $T(B_x)$ 912 to provide for an accurate record of the starting point of the blockchain 900. A user attempting to find the starting point of the blockchain 900 could be confident that the block $B_0$ 910 is the correct starting point of the blockchain 900 based on the system of record $(B_x)$ 940. As shown, the system of record $(B_x)$ 940 validates each time stamp in the blockchain 900 (e.g., the time stamp $T(B_0)$ 922, the time stamp $T(B_1)$ 932, and the time stamp $T(B_2)$ 960. The time stamp $T(B_2)$ 960 is provided for example purposes as the time stamp for the block in the blockchain 900 subsequent to the block $B_2$ 930.

Block $B_1$ 920 is the second block in the blockchain 900 and includes a time stamp $T(B_0)$ 922, a hash $H(D_1)$ 924, and data $D_1$ 926. In some arrangements, the time stamp $T(B_0)$ 922 records the date and time the block $B_1$ 920 was created, so as to provide for record keeping purposes. In some arrangements, the time stamp $T(B_0)$ 922 records the date and time each element in the block $B_1$ 920 was created, so as to provide for record keeping purposes. The time stamp $T(B_0)$ 922 is provided by the time stamp authority 950. In some arrangements, the time stamp $T(B_0)$ 922 links the block $B_1$ 920 to the block $B_0$ 910 such that the linkage in the blockchain 900 is maintained.

Block $B_2$ 930 is the third block in the blockchain 900 and includes a time stamp $T(B_1)$ 932, a hash $H(D_2)$ 934, and data $D_2$ 936. In some arrangements, the time stamp $T(B_1)$ 932 records the date and time the block $B_2$ 930 was created, so as to provide for record keeping purposes. In some arrangements, the time stamp $T(B_1)$ 932 records the date and time each element in the block $B_2$ 930 was created, so as to provide for record keeping purposes. The time stamp $T(B_1)$ 932 is provided by the time stamp authority 950. In some arrangements, the time stamp $T(B_1)$ 932 links the block $B_2$ 930 to the block $B_1$ 920 such that the linkage in the blockchain 900 is maintained.

Figure 10:
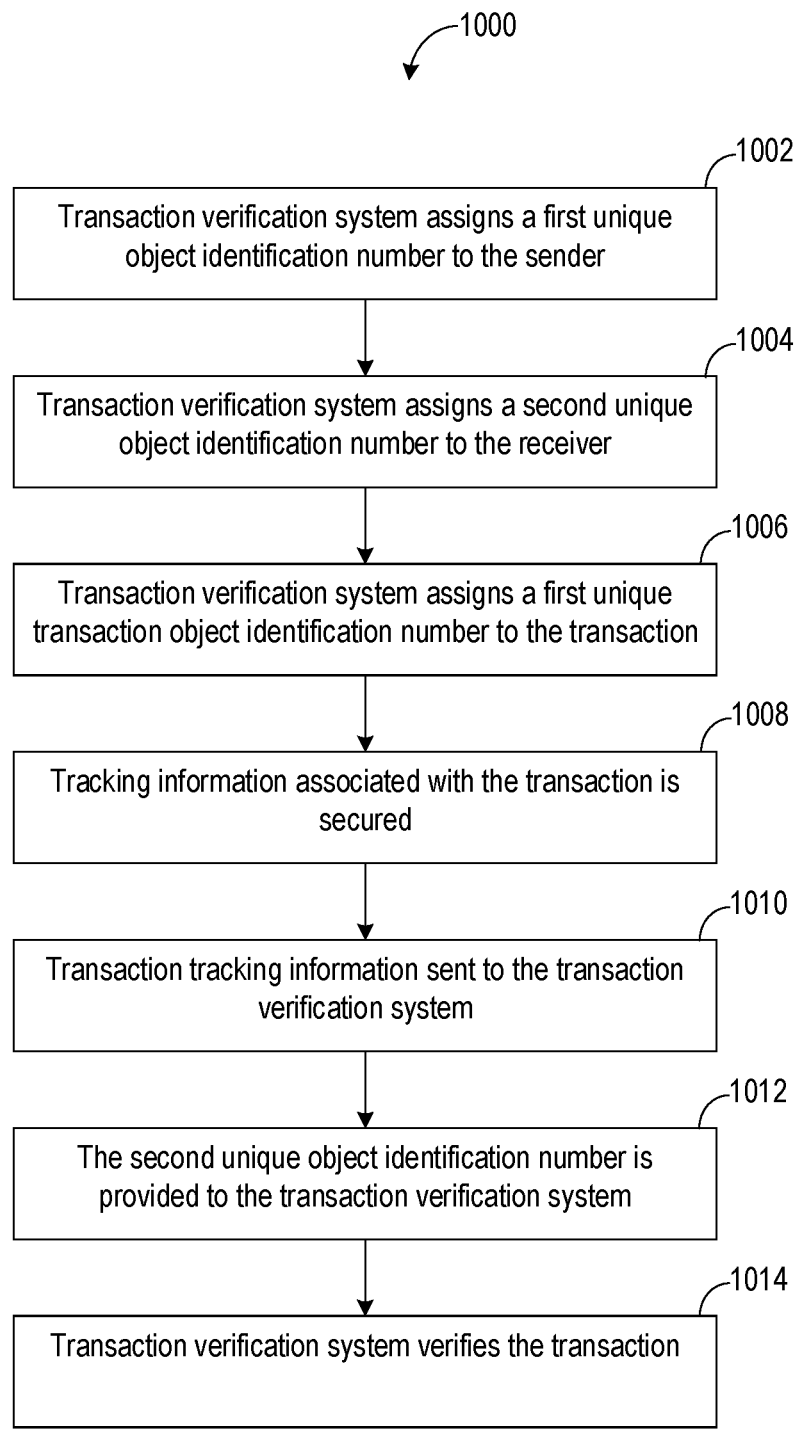
FIG. 10 is a flow diagram illustrating a method for verifying a transaction including unique object identifiers, according to various arrangements.

FIG. 10 is a flow diagram illustrating a method 1000 for verifying a transaction including unique object identifiers, according to various arrangements. Referring to FIGS. 1-9, the method 1000 is executed by the sender transaction system 110, the receiver transaction system 130, and the transaction verification system 150, in some arrangements.

At 1002, the transaction verification system 150 assigns a first unique object identification number to the sender. In some arrangements, the transaction verification system 150 communicates with the sender transaction system 110 to assign the sender a unique OID (e.g., the AOID 306).

At 1004, the transaction verification system 150 assigns a second unique object identification number to the receiver. In some arrangements, the transaction verification system 150 communicates with the receiver transaction system 130 to assign the receiver a unique OID (e.g., the BOID 308).

At 1006, the transaction verification system assigns a first unique transaction object identification number to the transaction. In some arrangements, the transaction verification system 150 communicates with either the sender transaction system 110 or the receiver transaction system 130 to assign the transaction a unique TOID (e.g., the TOID 402). In some arrangements, the TOID is assigned by entity that originates the transaction (e.g., the sender transaction system 110 or the receiver transaction system 130).

At 1008, the tracking information associated with the transaction is secured. In some arrangements, the sender secures the tracking information via the digital signature circuit 224.

At 1010, the transaction tracking information is sent to the transaction verification system 150. In some arrangements, the sender transaction system 110 sends the tracking information to the transaction verification system 150.

At 1012, the second unique object identification number is provided to the transaction verification system 150. In some arrangements, the receiver provides the BOID 308 to the transaction verification system 150 such that the transaction verification system 150 can verify the transaction by comparing the second unique object identification number provided by the sender to the second unique object identification number provided by the receiver.

At 1014, the transaction verification system 150 verifies the transaction. In some arrangements, if the two OIDs match (e.g., both OIDs provided are the BOID 308), then the transaction verification system 150 verifies the transaction. In some arrangements, if the two OIDs do not match (e.g., one OID provided is the BOID 308 and another OID provided is not the BOID 308), the transaction verification system 150 does not verify the transaction.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for recording a transaction within a blockchain having a plurality of blocks, comprising:
   receiving an indication of a first electronic transaction having a first electronic payment protocol format, wherein the first electronic payment protocol format comprises an automated clearing house (ACH) format, a real time payment (RTP) format, or a Society for Worldwide Interbank Financial Telecommunications (SWIFT) format;
   generating a first message having a standardized electronic extensible payment system (EEPS) format based on the first electronic transaction, the first message comprising data associated with the first electronic transaction, wherein the first message comprises:
      a first unique entity object identifier identifying a sender of an electronic message related to the first electronic transaction;
      a second unique entity object identifier identifying a receiver of the electronic message;
      a first transaction object identifier identifying the first electronic transaction, the first transaction object identifier being located at a top level of a hierarchy of a plurality of transaction object identifiers; and
      transaction information of the first electronic transaction, the transaction information comprising the first unique entity object identifier, the second unique entity object identifier, and the first transaction object identifier;

writing the first message based on the first electronic transaction in a first block of the blockchain in the standardized EEPS format adding a first timestamp token to the first block, the first timestamp token recording a time at which the first message was included in the first block;

receiving an indication of a second electronic transaction having a second electronic transaction format, wherein the second electronic transaction format comprises an email format or an electronic message format;

generating a second message having the standardized EEPS format based on the second electronic transaction, the second message comprising data associated with the second electronic transaction;

writing the second message based on the second electronic transaction in a second block of the blockchain in the standardized EEPS format;

adding a second timestamp token to the second block, the second timestamp token recording a time at which the second message was included in the second block;

cryptographically-linking the second block to the first block; and verifying the first electronic transaction based on information in the first block matching second information received from the receiver of the first electronic transaction.

2. The method of claim 1, further comprising recording a third message associated with the first message in the first block, the third message comprising data associated with the first electronic transaction.

3. The method of claim 2, wherein the first block includes a hash of the data associated with the first electronic transaction.

4. The method of claim 1, further comprising recording a fourth message associated with the second message in the second block, the fourth message comprising data associated with the second electronic transaction.

5. The method of claim 4, wherein the second block includes a hash of the data associated with the second electronic transaction.

6. The method of claim 1, wherein the first message further comprises a digital signature associated with the first unique entity object identifier.

7. A system for recording a transaction within a blockchain having a plurality of blocks, comprising:

a non-transitory computer readable media having computer-executable instructions embodied therein that, when executed by at least one processor of a computing system, cause the computing system to:

receive an indication of a first electronic transaction having a first electronic payment protocol format, wherein the first electronic payment protocol format comprises an automated clearing house (ACH) format, a real time payment (RTP) format, or a Society for Worldwide Interbank Financial Telecommunications (SWIFT) format;

generate a first message having a standardized electronic extensible payment system (EEPS) format based on the first electronic transaction, the first message comprising data associated with the first electronic transaction, wherein the first message comprises:

a first unique entity object identifier identifying a sender of an electronic message related to the first electronic transaction;

a second unique entity object identifier identifying a receiver of the electronic message;

a first transaction object identifier identifying the first electronic transaction, the first transaction object identifier being located at a top level of a hierarchy of a plurality of transaction object identifiers; and transaction information of the first electronic transaction, the transaction information comprising the first unique entity object identifier, the second unique entity object identifier, and the first transaction object identifier;

write the first message based on the first electronic transaction in a first block of the blockchain in the standardized EEPS format;

add a first timestamp token to the first block, the first timestamp token recording a time at which the first message was included in the first block;

receive an indication of a second electronic transaction having a second electronic transaction format, wherein the second electronic transaction format comprises an email format or an electronic message format;

generate a second message having the standardized EEPS format based on the second electronic transaction, the second message comprising data associated with the second electronic transaction;

write the second message based on the second electronic transaction in a second block of the blockchain in the standardized EEPS format;

add a second timestamp token to the second block, the second timestamp token recording a time at which the second message was included in the second block;

cryptographically-link the second block to the first block; and verifying the first electronic transaction based on information in the first block matching second information received from the receiver of the first electronic transaction.

8. The system of claim 7, wherein the computing system is further caused to record a third message associated with the first message in the first block, the third message comprising data associated with the first electronic transaction.

9. The system of claim 8, wherein the first block includes a hash of the data associated with the first electronic transaction.

10. The system of claim 7, wherein the computing system is further caused to record a fourth message associated with the second message in the second block, the fourth message comprising data associated with the second electronic transaction.

11. The system of claim 10, wherein the second block includes a hash of the data associated with the second electronic transaction.

12. The system of claim 7, wherein the first message further comprises a digital signature associated with the first unique entity object identifier.

13. A transaction verification system, comprising:
a network interface; and
a processing circuit configured to:
receive an indication of a first electronic transaction having a first electronic payment protocol format, wherein the first electronic payment protocol format comprises an automated clearing house (ACH) format, a real time payment (RTP) format, or a Society for Worldwide Interbank Financial Telecommunications (SWIFT) format;

generate a first message having a standardized electronic extensible payment system (EEPS) format based on the first electronic transaction, the first message comprising data associated with the first electronic transaction, wherein the first message comprises:
- a first unique entity object identifier identifying a sender of an electronic message related to the first electronic transaction;
- a second unique entity object identifier identifying a receiver of the electronic message;
- a first transaction object identifier identifying the first electronic transaction, the first transaction object identifier being located at a top level of a hierarchy of a plurality of transaction object identifiers; and
- transaction information of the first electronic transaction, the transaction information comprising the first unique entity object identifier, the second unique entity object identifier, and the first transaction object identifier;

write, in the standardized EEPS format, the first message based on the first electronic transaction in a first block of a blockchain having a plurality of blocks;

add a first timestamp token to the first block, the first timestamp token recording a time at which the first message was included in the first block;

receive an indication of a second electronic transaction having a second electronic transaction format, wherein the second electronic transaction format comprises an email format or an electronic message format;

generate a second message having the standardized EEPS format based on the second electronic transaction, the second message comprising data associated with the second electronic transaction;

write the second message based on the second electronic transaction in a second block of the blockchain in the standardized EEPS format, the second message comprising data associated with the second electronic transaction;

add a second timestamp token to the second block, the second timestamp token recording a time at which the second message was included in the second block; and cryptographically-link the second block to the first block; and verify the first electronic transaction based on information in the first block matching second information received from the receiver of the first electronic transaction.

14. The transaction verification system of claim 13, wherein the processing circuit is further configured to record a third message associated with the first message in the first block, the third message comprising data associated with the first electronic transaction.

15. The transaction verification system of claim 14, wherein the first block includes a hash of the data associated with the first electronic transaction.

16. The transaction verification system of claim 13, wherein the processing circuit is further configured to record a fourth message associated with the second message in the second block, the fourth message comprising data associated with the second electronic transaction.

17. The transaction verification system of claim 16, wherein the second block includes a hash of the data associated with the second electronic transaction.

* * * * *